(12) United States Patent
Youngwerth et al.

(10) Patent No.: US 9,995,347 B2
(45) Date of Patent: *Jun. 12, 2018

(54) CLUTCH PACK WITH WEAR LINERS

(71) Applicant: REKLUSE MOTOR SPORTS, Boise, ID (US)

(72) Inventors: Albert J. Youngwerth, Boise, ID (US); Sean G. Brown, Boise, ID (US); Karl E. Jensen, Meridian, ID (US)

(73) Assignee: Rekluse Motor Sports, Inc., Boise, ID (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/752,485

(22) Filed: Jun. 26, 2015

(65) Prior Publication Data

US 2015/0292569 A1   Oct. 15, 2015
US 2017/0343054 A9   Nov. 30, 2017

Related U.S. Application Data

(63) Continuation-in-part of application No. 14/094,144, filed on Dec. 2, 2013, now Pat. No. 9,097,289, and a continuation-in-part of application No. 13/338,535, filed on Dec. 28, 2011.

(51) Int. Cl.

| *F16D 13/64* | (2006.01) |
| *F16D 13/68* | (2006.01) |
| *F16D 69/00* | (2006.01) |

(52) U.S. Cl.
CPC ......... *F16D 13/683* (2013.01); *F16D 13/648* (2013.01); *F16D 2069/004* (2013.01)

(58) Field of Classification Search
CPC ........ F16D 13/52; F16D 13/62; F16D 13/648; F16D 13/683; F16D 2069/004; Y10T 29/49716

See application file for complete search history.

(56) References Cited

U.S. PATENT DOCUMENTS

| 1,683,806 | A | * | 9/1928 | Richards, Jr. | ........... F16D 13/68 |
| | | | | | 188/73.1 |
| 2,059,158 | A | * | 10/1936 | Wemp | ...................... F16D 13/64 |
| | | | | | 192/107 C |
| 4,322,148 | A | * | 3/1982 | Yoshikawa | ............ G03B 17/20 |
| | | | | | 396/176 |
| 4,574,449 | A | * | 3/1986 | Wussow | ................... B23P 6/00 |
| | | | | | 192/48.5 |
| 6,272,725 | B1 | * | 8/2001 | Stout, Jr. | ................... B23P 6/00 |
| | | | | | 192/70.2 |
| 7,204,357 | B1 | * | 4/2007 | Dumas | ................ F16D 25/0638 |
| | | | | | 192/70.12 |
| 8,607,952 | B2 | * | 12/2013 | Keating | ................ F16D 13/683 |
| | | | | | 192/112 |

(Continued)

*Primary Examiner* — Richard M Lorence
(74) *Attorney, Agent, or Firm* — Scott D. Swanson; Shaver & Swanson, LLP

(57) ABSTRACT

An improved clutch pack is disclosed. The clutch pack incorporates liners, improved driving friction disks and driven disks where the thickness of the improved driving friction disks and driven disks are selected in order to allow more driving friction disks and more driven disks to be used within the improved clutch pack while maintaining approximately the same overall height as compared to the standard clutch pack the vehicles clutch system was designed for.

30 Claims, 15 Drawing Sheets

(56) References Cited

U.S. PATENT DOCUMENTS

| | | | | |
|---|---|---|---|---|
| 8,857,592 B2* | 10/2014 | Mangiagli | ............ | F16D 13/683 |
| | | | | 192/70.13 |
| 9,097,289 B2* | 8/2015 | Youngwerth | ......... | F16D 13/648 |
| 2013/0168198 A1* | 7/2013 | Youngwerth | ......... | F16D 13/683 |
| | | | | 192/107 M |

* cited by examiner

CLUTCH PACK WITH WEAR LINERS

PRIORITY/CROSS-REFERENCE TO RELATED APPLICATIONS

This application is a continuation-in-part application that claims the benefit of U.S. application Ser. No. 13/338,535, filed Dec. 28, 2011 the disclosure of which is incorporated by reference and this application is a continuation-in-part that claims the benefit of U.S. application Ser. No. 14/094,144, filed Dec. 2, 2013 the disclosure of which is incorporated by reference.

TECHNICAL FIELD

The presently disclosed technology relates to vehicle clutches, and more particularly to clutches with multi-disk clutch packs.

BACKGROUND OF THE INVENTION

This invention relates to a clutch system of the friction type placed in a power transmission system. In some instances units of measurement are provided in millimeters, where millimeters may also be listed as "mm" or "millimeters".

Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism. Most clutch systems can be disengaged by means of a lever acting on a clutch throwout which pushes the pressure plate away from clutch pack, rotationally decoupling the clutch input and clutch output.

Typically, such clutch systems include a clutch disengagement system consisting of a lever mechanically coupled to the pressure plate such that when the lever is actuated, the pressure plate's compressive force on the clutch pack is removed, disconnecting the rotational coupling between the clutch input and clutch output. Clutch disengagement systems typically couple the lever to the pressure plate mechanically through a hydraulic actuation system or a cable actuation system.

Most motorcycles incorporate a manual transmission coupled to the engine via a multi-plate clutch assembly in an oil bath. Typically, the multi-plate clutch is engaged/disengaged by the operator via a lever mounted on the handlebar. Engines with high output, require more spring pressure to transmit the torque of the engine. The operator must overcome this spring pressure at the lever to disengage the clutch. Excessive spring force can cause fatigue for the operator.

A typical multi-plate clutch system, such as the clutch system incorporated in a 2011 Honda CRF-450R uses a clutch pack incorporating 8 driving friction plates or disks coupled to the clutch input and 7 driven plates or disks coupled to the clutch output. The friction plates are 3 mm thick and the driven plates are 1.6 mm thick. By configuring the clutch with 1.8 mm thick friction plates and 1.2 mm drive plates, a clutch pack can be configured using 12 driving friction plates or disks and 11 driven plates or disks in approximately the same space. With the additional number of friction surfaces, spring force in the clutch can be reduced by ⅓ and still transfer the same amount of torque as the 8 friction plate clutch pack providing a significant benefit to the operator in terms of reduced clutch lever effort.

Another example of a typical multi-plate clutch system is the clutch system incorporated in a 2010 Honda CRF-250R which uses a clutch pack incorporating 8 friction plates coupled to the clutch input and 7 driven plates coupled to the clutch output. The friction plates are 3 mm thick and the driven plates are 1.4 mm thick. By configuring the clutch with 1.8 mm thick friction plates and 1.0 mm driven plates, a clutch pack can be configured using 12 friction plates and 11 driven plates in approximately the same space. With the additional number of friction surfaces, spring force in the clutch can be reduced by ⅓ and still transfer the same amount of torque as the 8 friction plate clutch pack providing a significant benefit to the operator in terms of reduced clutch lever effort.

Another example of a typical multi-plate clutch system is the clutch system incorporated in a 2014 Suzuki RMZ450 which uses a clutch pack incorporating 8 friction plates coupled to the clutch input and 7 driven plates coupled to the clutch output. The friction plates are 3.15 mm thick and the driven plates are 1.6 mm thick. By configuring the clutch with 1.8 mm thick friction plates, four 1.6 mm drive plates and seven 1.2 mm drive plates, a clutch pack can be configured using 12 friction plates and 11 driven plates in approximately the same space. With the additional number of friction surfaces, spring force in the clutch can be reduced by ⅓ and still transfer the same amount of torque as the 8 friction plate clutch pack providing a significant benefit to the operator in terms of reduced clutch lever effort.

Alternatively, the same springs used with the standard 8 friction plate clutch pack can be used with the clutch pack utilizing twelve 1.8 mm friction disk which in turn significantly increases the torque capacity of the clutch system which can improve performance and lower operating temperatures of the clutch system.

Most motorcycles incorporate a clutch basket that is formed from aluminum. Aluminum is inexpensive to cast and lightweight relative to other materials such as steel. However, one disadvantage of aluminum for constructing a clutch basket is that it is soft relative to other materials such as steel. Significant wear at the surfaces on the clutch basket where the driving friction disks engage the clutch basket is a common problem.

One problem with forming the driving friction plates from aluminum is heat storage and heat expansion. When the clutch slips, during take-off for example, heat is generated. The driving friction plates and driven plates absorb this heat until the heat can dissipate out of the clutch system. If the clutch slips excessively, the heat build-up can be significant; causing the clutch pack to expand. When the clutch pack expands from heat, the pressure plate is pushed away from the clutch throwout; requiring more lever movement to rotationally decouple the clutch input and clutch output. This phenomenon is known as "clutch fade".

It is well known that steel, by volume, has more thermal capacity and a lower thermal coefficient of expansion than aluminum. By forming the friction plate from steel instead of aluminum, given the same amount of slip and therefore the same amount of heat generation, a clutch system incorporating driving friction disks formed from steel will have reduced "clutch fade" vs. a clutch system incorporating driving friction disks formed from aluminum.

However, steel is typically much harder than aluminum. When a driving friction disk formed from steel is used in place of a driving friction disk formed from aluminum, wear at the surfaces on the aluminum clutch basket where the driving friction disks engage the clutch basket is accelerated.

The KTM 2006 450 SXF motorcycle model uses driving friction plates or disks formed from steel and a clutch basket formed from steel. The KTM motorcycles are considered a premium brand and are generally more expensive than similar motorcycles from other manufactures. Most modern motorcycles use driving friction plates and a clutch basket formed from aluminum.

One way to overcome the problem of excessive wear of the clutch basket from the driving friction plates is to form the clutch basket from a harder, more wear resistant material such as steel. However, forming a clutch basket from steel would increase its weight and likely its cost versus a clutch basket formed from aluminum. A lightweight clutch basket is advantageous in that it has less reciprocating mass; allowing for quicker acceleration than a heavier clutch basket.

Typically the driving friction plates wear out and are replaced several times before the clutch basket is replaced due to wear. Requiring the owner of a vehicle to purchase a new clutch basket to prevent rapid wear from the use of improved driving frictions plates formed from steel is undesirable for both cost and increased weight of the clutch basket.

Steel is also stronger than aluminum. Forming the driving friction plate from steel allows the use of a driving friction plate that is thinner than a comparable aluminum driving friction disk and having the same strength. It is well known that by using more driving friction plates in a clutch system that the clutch system will have greater torque capacity assuming equal spring pressure. However, a thinner driving friction plate will have even greater wear characteristics against a relatively soft clutch basket due to the reduced surface area at the point of engagement with the clutch basket.

Typically many different vehicles from many different manufactures will use a friction disk of the same dimensions.

Youngwerth et al. in U.S. patent application Ser. No. 13/338,535 have proposed using liners, formed from a hard material such as steel, between the clutch basket and the driving friction plates to reduce wear and provide a replaceable wear surface and is included herein by reference. Such a liner can be very advantageous in use, especially when combined with driving friction plates formed from steel.

In addition, Youngwerth et al. in U.S. patent application Ser. No. 14/094,144 have introduced an improved driving friction disk or plate which among other things utilizes a friction pad design which allows an increased number of driving friction disks and driven disks be configured into a clutch pack while providing minimal drag as compared to clutch pack configured with eight prior art driving friction disks.

Therefore, a need exists for an improved clutch pack utilizing liners, improved driving friction disks and driven disks where the thickness of the improved driving friction disks and driven disks are selected in order to allow more driving friction disks and more driven disks to be used within the improved clutch pack while maintaining approximately the same overall height as compared to the standard clutch pack the vehicles clutch system was designed for. Furthermore, the improved clutch pack with liners for use with a vehicle's existing clutch basket should be able to be easily installed by the vehicle owner, without special tools or adhesives. A need exists for the liner to be restrained from radial outward movement by the inner diameter of the clutch basket so as to work with the stock clutch basket supplied with most modern motorcycles. The liner should provide improved wear resistance to the clutch basket driving friction plate engagement surfaces; especially when used in conjunction with a driving friction plate formed from steel or other material that has increased wear properties against the vehicle clutch basket. Furthermore, a need exists for a clutch pack system with improved resistance to heat induced "clutch fade", that will easily retrofit into a vehicle's existing clutch system without imposing increased wear on the clutch basket's driving friction plate engagement surfaces. The improved clutch pack's driving friction disks should incorporate a clutch basket engagement tab with reduced width versus the standard friction disk so as to fit in the narrowed space provided by the improved liner.

Heretofore, no one has proposed a clutch pack that can easily be adaptable by a typical vehicle owner to an existing typical vehicle standard clutch basket, without fasteners or adhesives; whose driving friction plates are formed from a material that offers improved thermal heat capacity vs. the original driving friction plates and that can be retrofitted into an existing clutch basket that is formed from a material softer than the improved driving friction disk material, without creating accelerated wear on the clutch basket's driving friction plate engagement surfaces and that includes a clutch basket engagement tab with a reduced width to fit within the narrowed slot space provided by the liner.

Therefore, it is one object of the invention to provide a clutch pack with improved thermal properties while maintaining approximately the same overall thickness as the standard clutch pack and that can operate within a standard clutch basket without accelerating the wear of the standard clutch basket in operation. It is another object of the invention to provide a liner system that can easily be retrofitted to a clutch basket that was not designed to use a liner system, without the need for special tools or fasteners. It is another object of the invention to provide the improved liner system in conjunction with a friction disk system with improved thermal properties and less thickness and formed with clutch basket engagement tabs whose width is selected to fit inside the narrowed space provided by the improved liner system.

However, as more clutch plates are added to the clutch system, parasitic drag is increased during clutch disengagement. Parasitic drag is torque transferred between the clutch input and the clutch output when the clutch lever is in the disengaged position. Parasitic drag has many causes. One cause is the incidental contact between adjacent friction and drive plates. Another cause is inadequate distribution of oil between the friction and drive plates. Parasitic drag can make it difficult for the operator to find neutral position of the transmission at idle speed, make it difficult to change gears during operation, or cause the motorcycle to drag forward as engine speed is increased with the clutch lever disengaged.

Multi-plate clutch systems typically deliver oil to the clutch pack through two different mechanisms: by the flow oil under centrifugal force as it flows from the inside to the outside of the clutch pack or from the outside inwards as the clutch system rotates in a bath of oil, the rotation in the bath forcing oil into the plates. In many clutch system designs, there is very little oil coming from the inside of the clutch. In clutch systems that rotate in an oil bath, generally no design considerations are made to help oil flow into the clutch pack before centrifugal forces push the oil back out of the clutch pack.

Therefore a need exists for an improved clutch pack utilizing improved friction disks design that better distributes oil between the friction and drive plates to improve lubrication and to help keep the plates separated to reduce incidental contact to reduce the effects of parasitic drag.

A preferred embodiment of the present invention is shown in FIGS. 13 and 14.

DETAILED DESCRIPTION OF THE INVENTION

Figure 1:
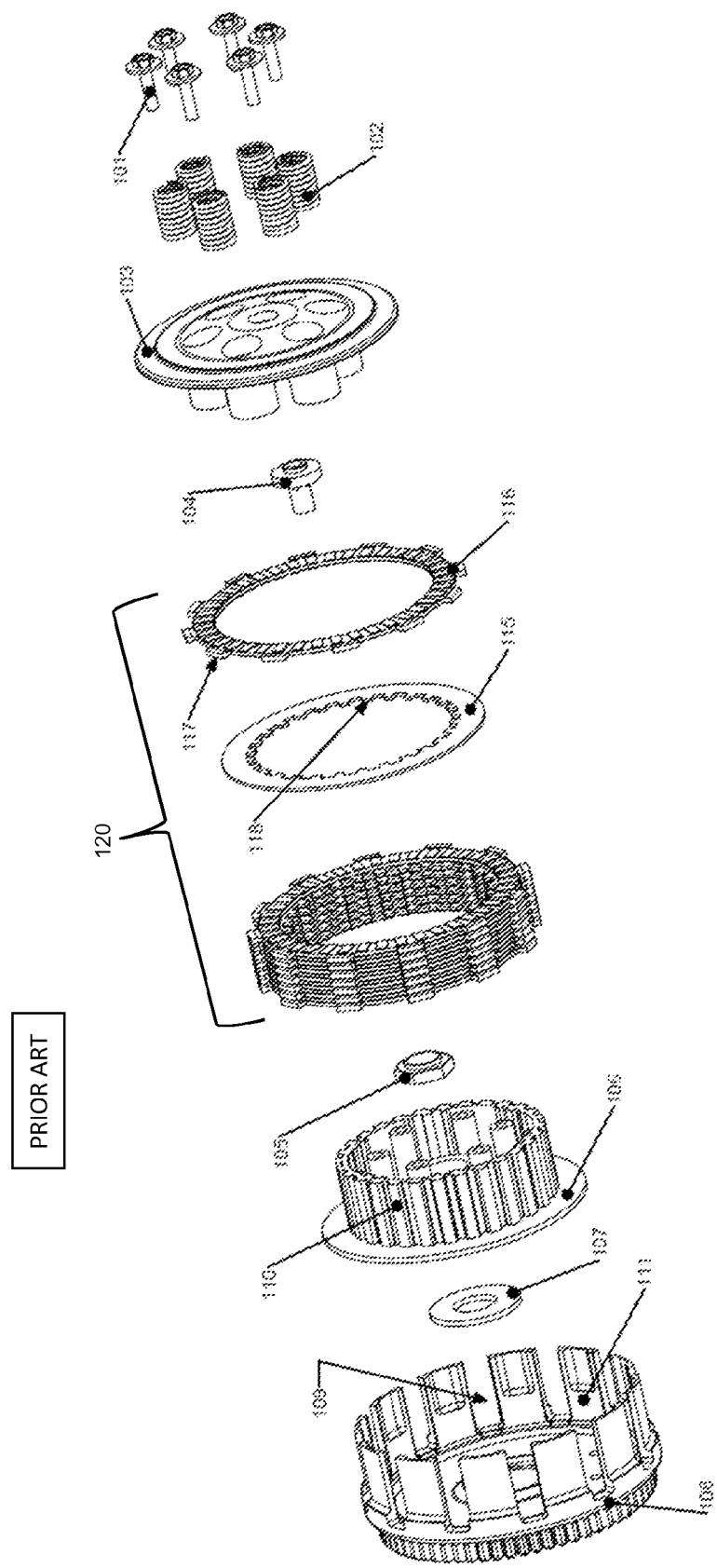
FIG. 1 is an exploded view of a prior art clutch system.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides for an improved clutch pack. The improved clutch pack incorporates liners for the slots in a clutch basket, improved driving friction disks which have narrowed tab features sized to fit into the slots with liners where the improved driving friction disks are of an appropriate thickness to allow the improved clutch pack to be configured with an increased number of clutch disks or plates, both driven and driving, in order to provide the operator the option to either increase torque capacity of the clutch, and/or lower the spring force compelling the pressure plate into contact with the clutch pack; lowering the spring force compelling the pressure plate reduces the effort for the operator to operate the clutch disengagement system.

The preferred embodiment of the present invention is designed to work in a standard clutch system with a standard clutch pack containing a predetermined number of clutch disks and overall height and where the friction disks are thicker than the improved friction disks.

FIG. 1 is an exploded view of a prior art clutch. The configuration of the clutch basket 108, center clutch thrust washer 107, center clutch 106, center clutch nut 105, throw-out 104, driving friction disk 116, driven disk 115, pressure plate 103, standard springs 102 and spring bolts 101 are typical of most modern motorcycle clutches, this structure is commonly employed in many types of power transmission devices. Clutch pack 120 is comprised of driving friction disks 116 and driven disk 115. The clutch basket 108 contains slots 109 which receive the friction disk tabs 117 and thus coupling the clutch basket 108 and driving friction disks 116 rotationally. The center clutch 106 contains a profiled ring 110 which provides rotational coupling to the teeth 118 of the driven plates 115. The clutch basket 108 is typically coupled rotationally to a power input source such as an engine and the center clutch 106 is typically coupled rotationally to an output such as a transmission. In another embodiment the clutch basket 108 is coupled rotationally to an output and the center clutch 106 is coupled rotationally to a power input. Typically the clutch basket 108 contains an opening in the center for receiving a transmission input shaft (not shown); the clutch basket 108 is configured with a bearing between the clutch basket 108 and the transmission input shaft so that the clutch basket 108 can rotate independently of the transmission input shaft with minimal friction. Typically a center clutch thrust washer 107 is disposed between a center clutch 106 and the clutch basket 108. A center clutch nut 105 secures the center clutch 106 against the center clutch thrust washer 107 which in turn is secured against a shoulder (not shown) on the transmission input shaft. The center clutch is typically rotationally coupled to the transmission input shaft via a suitable spline.

Figure 2:
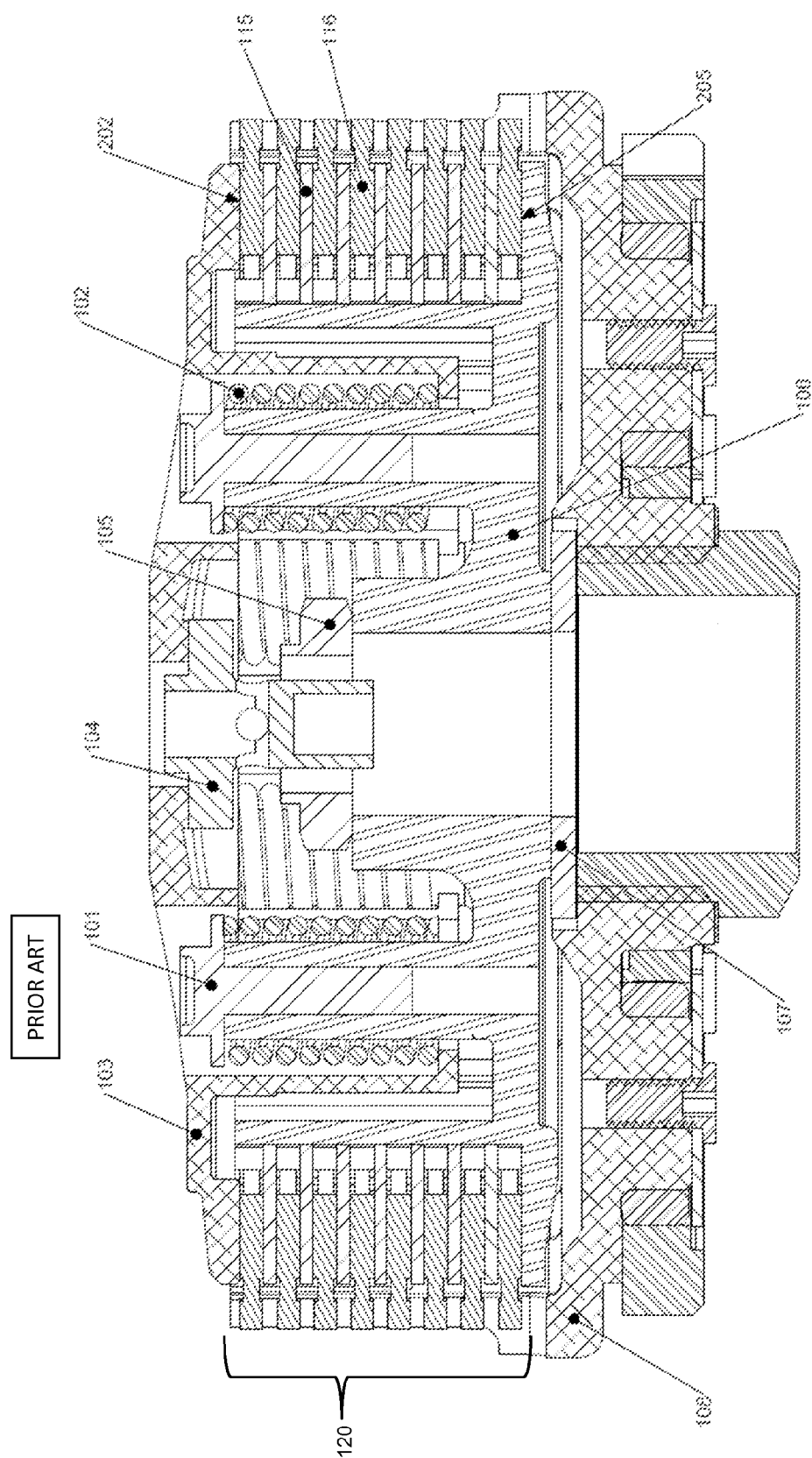
FIG. 2 is a cross-section view of a prior art clutch system.

FIG. 2 is a section view of the prior art clutch shown in FIG. 1. As best seen in FIG. 2, the clutch pack 120 is comprised of eight driving friction disks 116 and seven driven plates 115. The clutch pack 120 establishes the distance between the pressure plate flange face 202 and center clutch flange face 205. The standard springs 102 act on the pressure plate 103 to compress the clutch pack 120 forcing the adjacent surfaces of the driving friction disks 116 and driven disks 115 to become coupled rotationally and in turn coupling the basket 108 and center clutch 106 rotationally. The throw-out 104 is coupled to a clutch disengagement system (not shown). The clutch disengagement system (not shown) is operable to selectively position the throw-out 104 for the purpose of pushing the pressure plate 103 away from the clutch pack 120 to disengage the clutch. Alternatively, the clutch disengagement system (not shown) is operable to selectively position the throw-out 104 for the purpose of returning the pressure plate 103 into contact with the clutch pack 120 to engage the clutch. In another embodiment the clutch pack 120 is comprised of nine driving friction disks 116 and eight driven disks 115. In the preferred embodiment the clutch pack 120 is comprised of eight 3-millimeter thick driving friction disks 116 and seven 1.6-millimeter driven disks 115 resulting in the clutch pack 120 being approximately 35.2-millimeters tall. In other prior art the clutch pack 120 is less than 35-millimeters tall and is comprised of eight driving friction disks and seven driven disks that are less than 1.6-millimeters thick. In yet other prior art, the clutch pack 120 is taller than 35.2 millimeters and is comprised of nine driving friction disks which are approximately 4-millimeters thick and eight driven disks which are approximately 2-millimeters thick.

Figure 3:
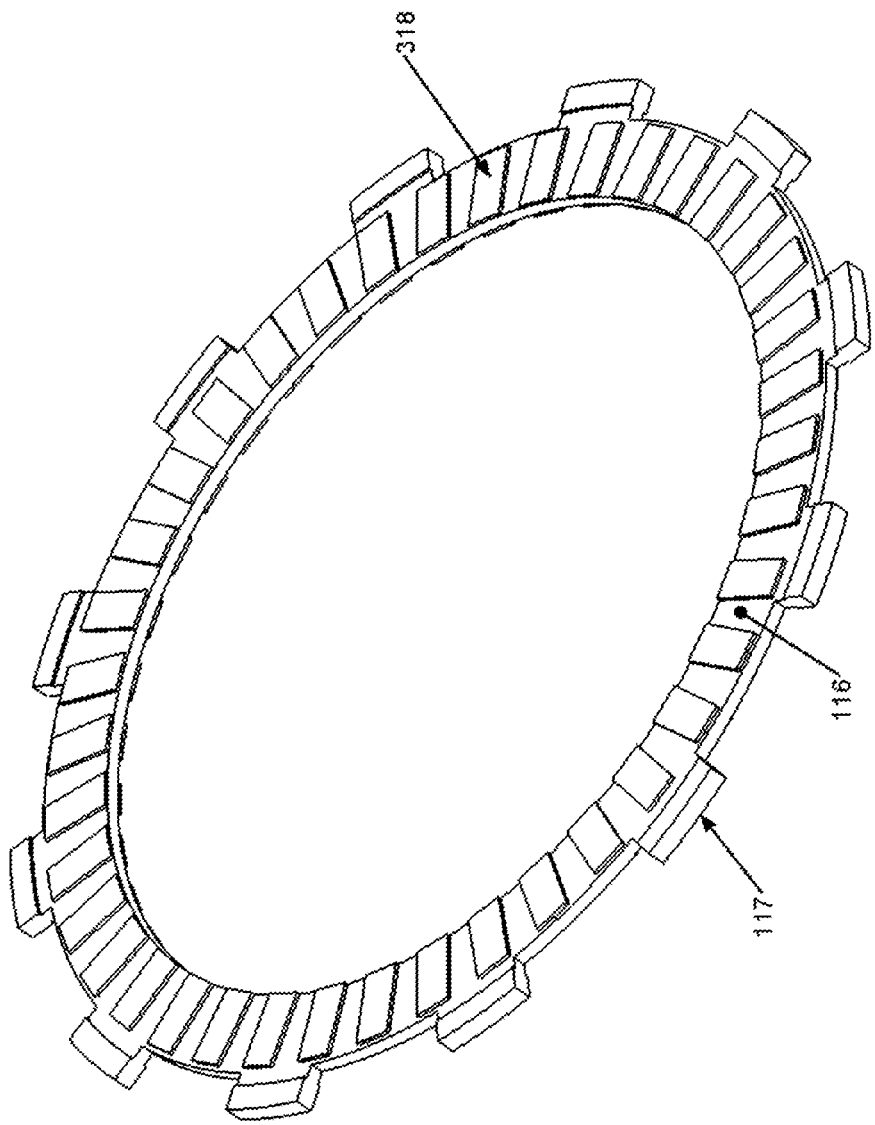
FIG. 3 is an isometric view of a prior art driving friction disk.

FIG. 3 is an isometric view of a prior art driving friction disk 116 utilized in the prior art clutch. FIG. 3 shows rectangular pads 318 affixed to the driving friction disk 116. The rectangular pads 318 are affixed to both sides of the driving friction disk 116. The rectangular pads 318 are typically a composite material where the material has frictional properties suited for engaging adjacent surfaces of drive plates 115 with which the friction disks 116 contact. In another embodiment, the driving friction disk 116 utilizes forty-eight rectangular pads 318 per side. In another embodiment twenty-four rectangular pads 318 per side are used. In yet another embodiment the rectangular pads 318 are wider and therefore approach a more square shape.

Figure 4:
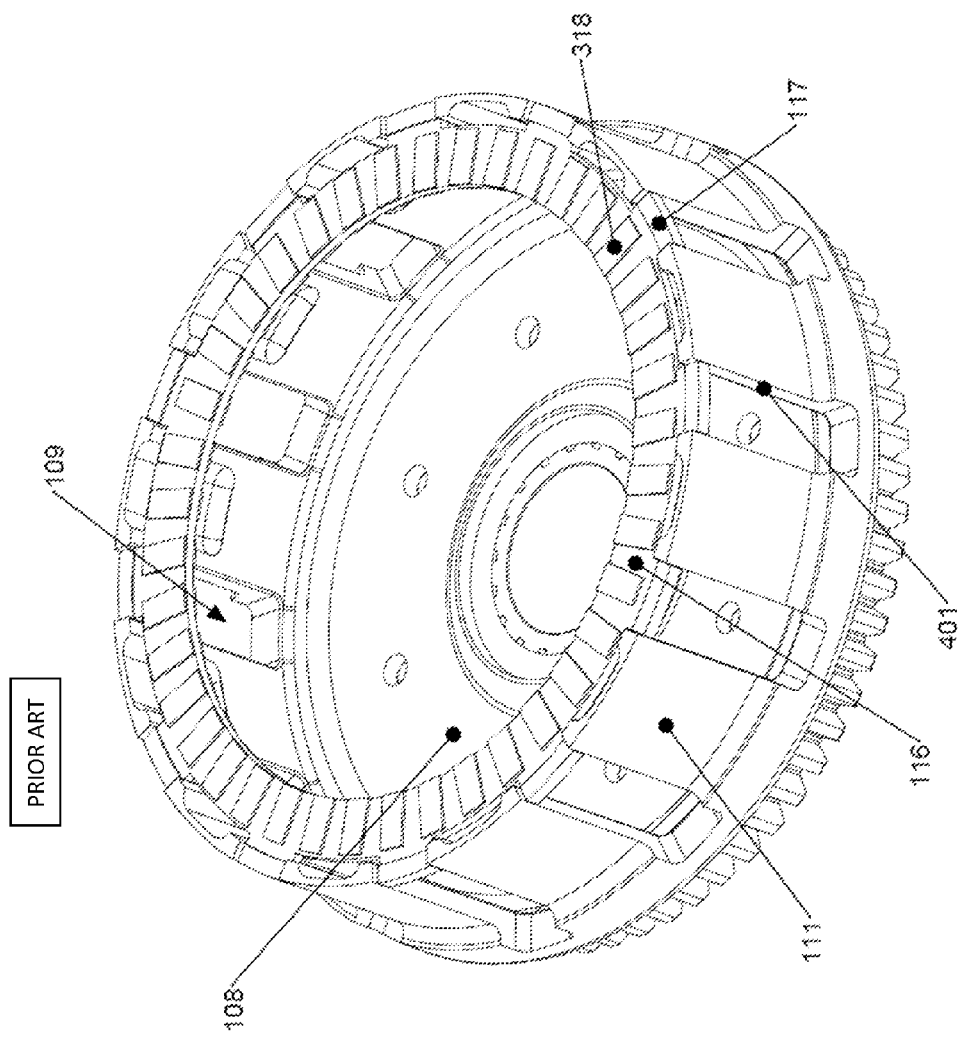
FIG. 4 is an isometric view of a prior art clutch basket with prior art driving friction disk.

FIG. 4 shows the prior art clutch basket 108 in engagement with a single prior art driving friction disk 116. The driving friction disk 116 includes a plurality of driving friction disk tabs 117. The clutch basket 108 includes a plurality of fingers 111. Between each finger 111 is a slot 109 to engage a driving friction disk tab 117. The edge of each finger 111 has a clutch basket driving engagement surface 401 to engage and rotationally couple the driving friction disk tabs 117 of the driving friction disk 116. The clutch basket is subject to wear from the driving forces applied to the driving friction disk tabs 117. The rate of wear will generally be increased when the driving friction disk tab 117 is made from a material harder than the clutch basket.

Figure 5B:
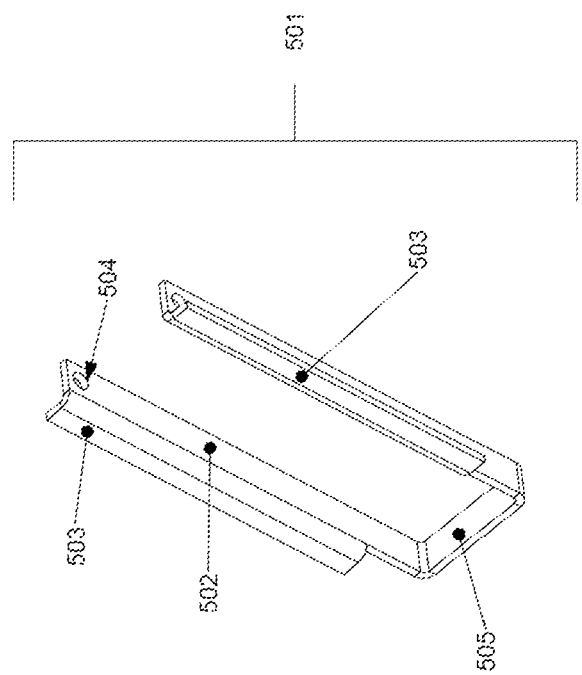
FIGS. 5A and 5B show views of the basket slot liner.
Figure 5A:
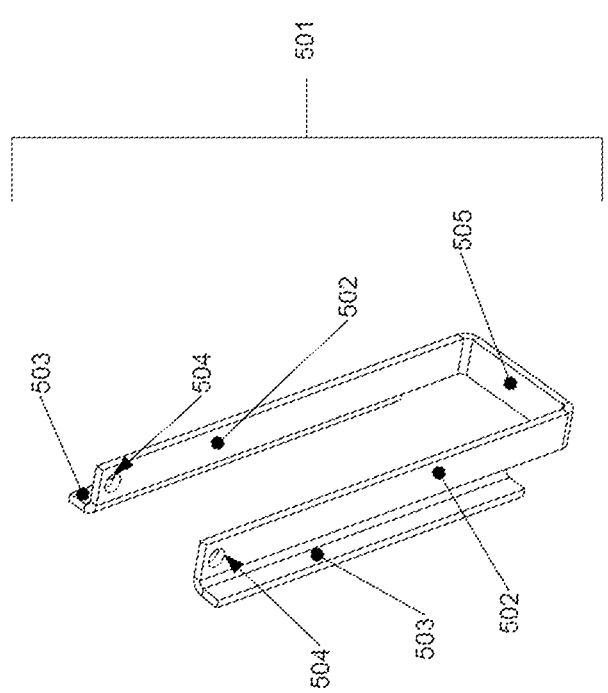

FIGS. 5A and 5B show one embodiment of the improved clutch basket liner 501. The liner 501 is generally U-shaped, with two legs 502 connected by a base 505. The legs 502 are at an angle of approximately 90 degrees to the liner base. In another embodiment, the legs 502 are at angle greater than 90 degrees to the liner base. In this embodiment, the increased angle will require the legs to apply an outward spring force against the clutch basket, helping to hold the liner 501 in place during installation.

Extending from each leg 502 at a slightly obtuse angle is an ID capture flange 503. At an end of each leg 502 is an optional hole 504. The hole 504, when used with a suitable tool, can be used to lift the liner 501 and entire clutch pack out of the clutch assembly.

Figure 6:
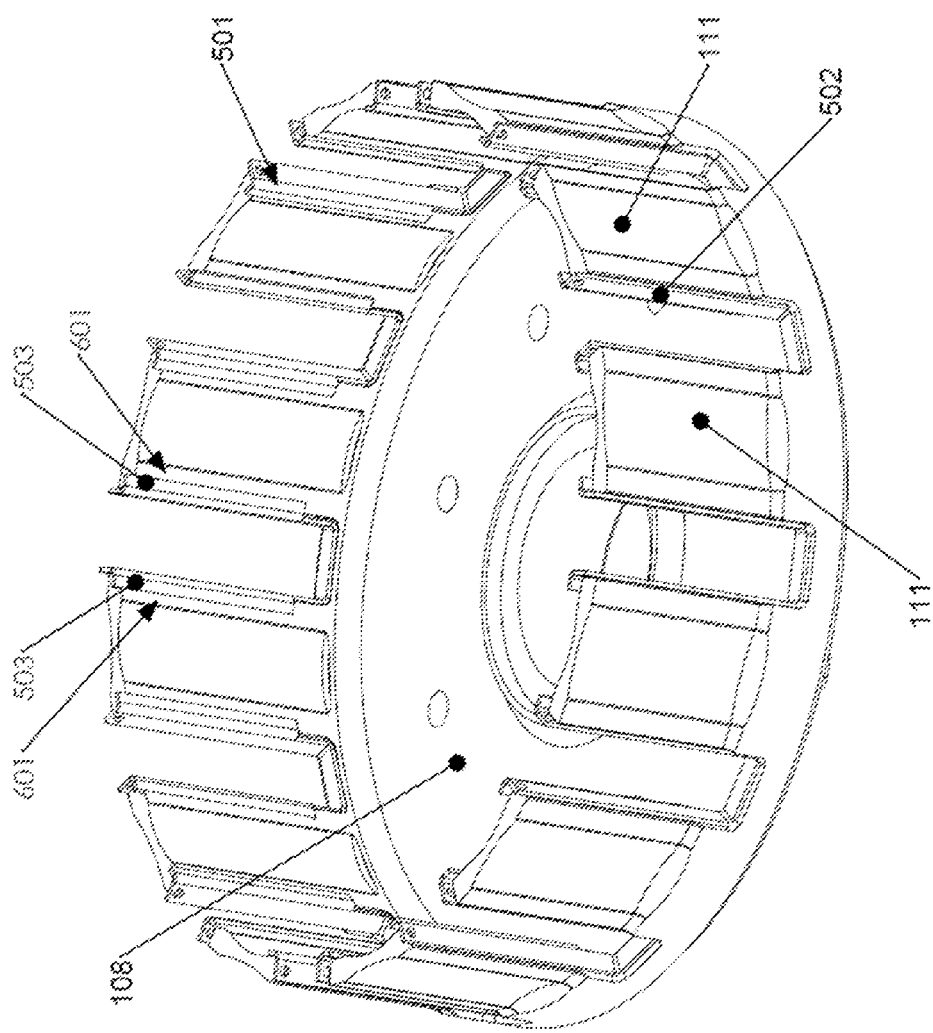
FIG. 6 is a view of the improved liner installed into a typical prior art clutch basket.
Figure 7:
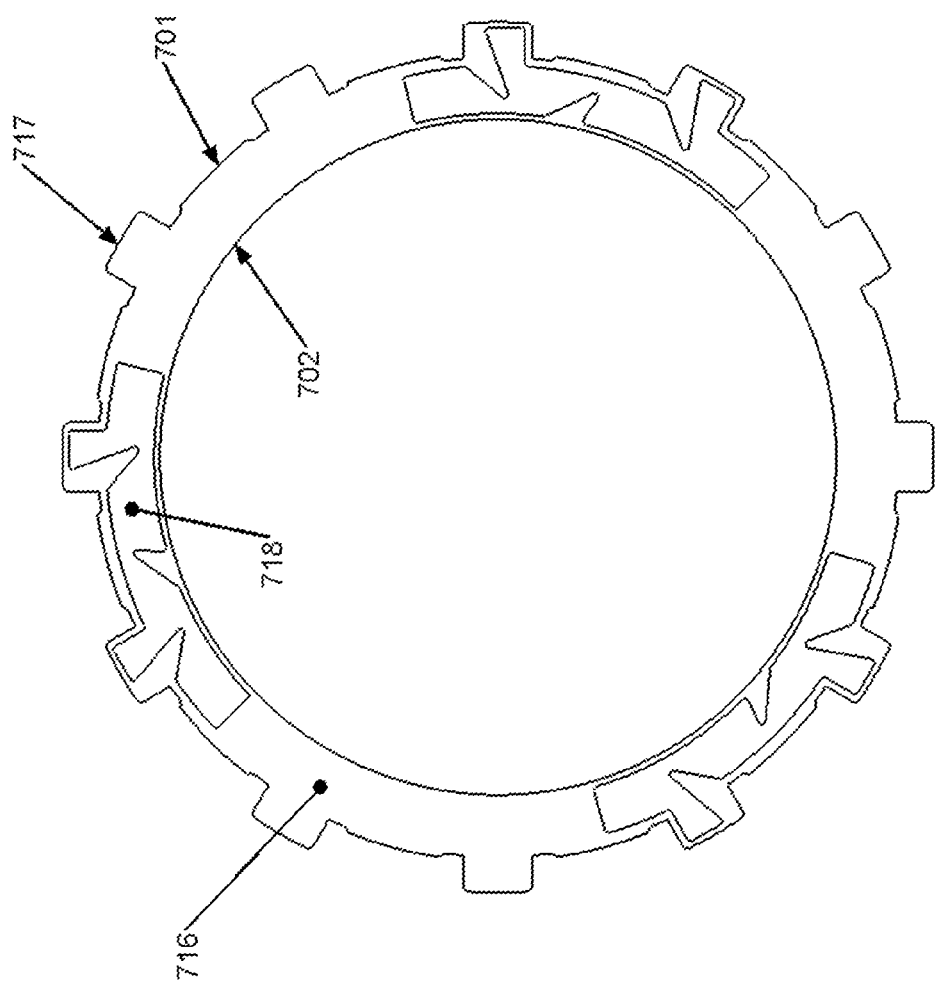
FIG. 7 is a diagram showing the improved friction plate.

FIG. 6 depicts the improved clutch basket liner 501 installed between adjacent fingers 111 of the prior art clutch basket 108. The two legs 502 cover the surface of the clutch basket driving engagement surface 411 (not visible in FIG. 6). The clutch basket liner 501 is restrained from radial outward movement by the ID capture flange 503 engaging the inner surface 601 of the clutch basket. The obtuse angle allows the ID capture flange 503 to conform closely to the inner diameter of the basket and provides clearance to the friction disk outer diameter. The optimal angle between the ID capture flange 503 and the legs 502 is determined by the inner diameter of the basket: a smaller basket inner diameter requires a larger angle and a larger basket inner diameter requires a smaller angle. In one embodiment, the optimal angle between the ID capture flange 503 and the legs 502 is 95 degrees. The capture flange 503 prevents the clutch basket liner 501 from being flung radially out of the basket due to centrifugal force when the clutch basket 108 rotates FIG. 7 shows the improved driving friction disk 716 design. The general shape of the driving friction disk 716 is of typical design, having a plate inner diameter 702, a plate outer diameter 701, a plurality of narrowed tabs 717 and one or more friction pads 718. In a preferred embodiment, the driving friction disk 716 incorporates 3 friction pads 718. In another embodiment, the driving friction disk 716 incorporates 6 friction pads 718. In the preferred embodiment, the driving friction disk 716 has friction pads 718 bonded to both sides of the driving friction disk 716.

Figure 8:
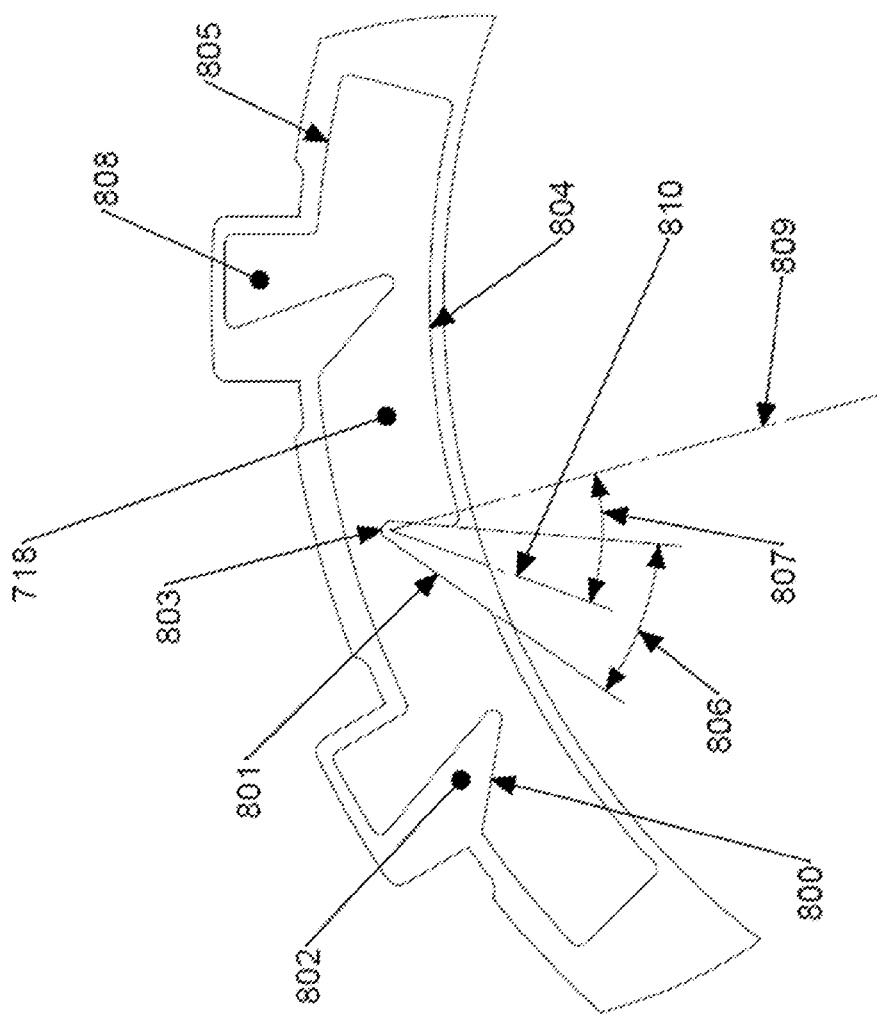
FIG. 8 is a view showing the details of the improved friction pad.

FIG. 8 shows the details of the friction pad 718 portion of the improved driving friction disk 716. Each friction pad 718, has a pad inner diameter 804, a pad outer diameter 805 and a pad tab portion 808. In a preferred embodiment, each friction pad 718 incorporates outer diameter V shaped grooves 800 and inner diameter V shaped grooves 801. In another embodiment, only outer diameter V shaped grooves 800 are incorporated into each friction pad 718. In another embodiment, only inner diameter V shaped grooves 801 are incorporated into each friction pad 718. In a preferred embodiment, each outer diameter V shaped groove 800 includes a portion that extends outward to the edge of the friction pad tab portion 808. In another embodiment, the outer diameter V shaped groove 800 extends only to the pad outer diameter 805.

Each V shaped groove has a groove opening 802, and a groove center point 803; the groove center point 803 being substantially near the center of the friction pad 718. The groove opening 802 can be represented as a groove opening angle 806. In a preferred embodiment, the groove opening angle 806 is 30 degrees. In another embodiment, the groove opening angle 806 is 40 degrees. Each V shaped groove is configured with a groove offset angle 807 measured between a line 809 extending from the center of the friction plate through the groove center point 803 and a position line 810 extending from the groove center point 803 through the center of inner diameter V shaped grooves 801 or outer diameter V shaped grooves 800. In a preferred embodiment the groove offset angle 807 is a positive 35 degrees representing a left-to-right groove offset angle 807. In another embodiment, the groove offset angle 807 is a negative 35 degrees representing a right-to-left groove offset angle 807. In another embodiment, the groove offset angle 807 is 0 degrees representing a groove that is symmetric relative to a line extending from the center of the driving friction disk 716 and through the groove center point 803. In another embodiment the groove offset angle 807 is equal to one half the groove opening angle 806 representing a groove wherein one edge of the V groove is collinear with a line extending from the center of the friction plate.

Figure 9A:
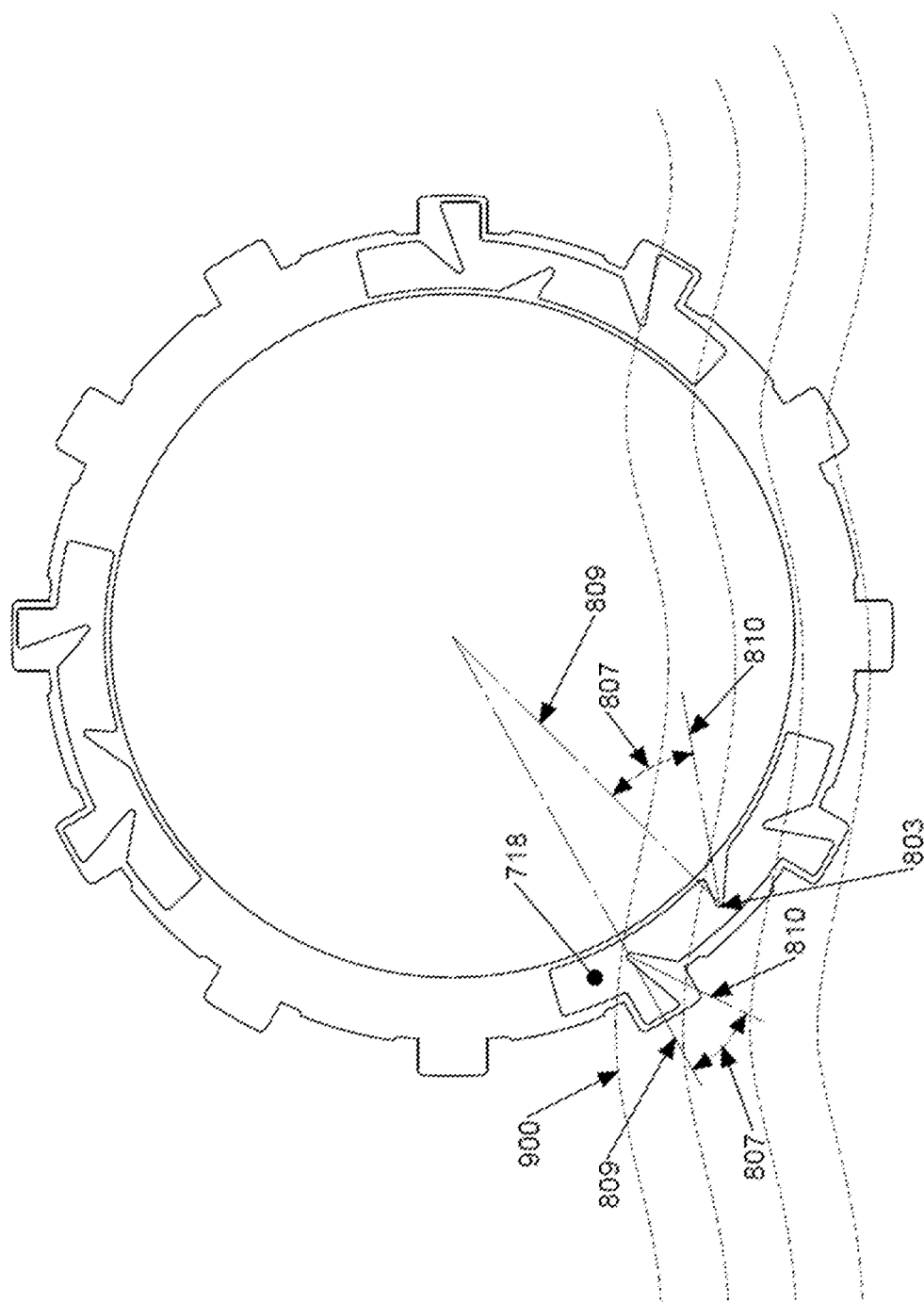
FIG. 9A is a view showing the details of the improved friction plate as it passes through an oil bath.
Figure 9B:
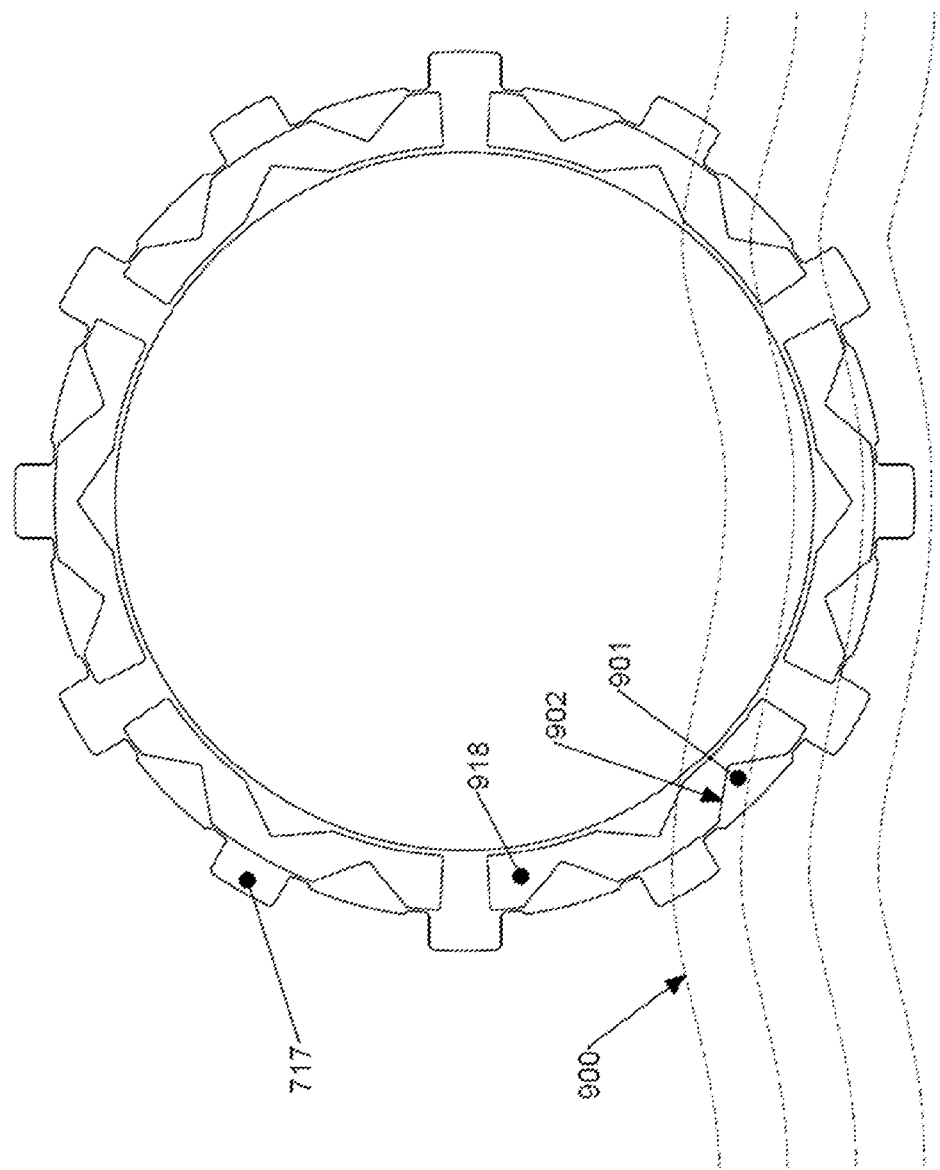
FIG. 9B is a view showing the details of the prior art friction plate as it passes through an oil bath.

As can best be seen in FIG. 9A, the groove offset angle 807 beneficially captures the rotation of the driving friction disk 716 to force the oil 900 to the groove center point 803. As can be seen in FIG. 9B, the prior art pad 918 with symmetric outer diameter V groove 901 allows oil to escape from the trailing edge 902 of the prior art symmetric outer diameter V groove. The friction pad 718 of the driving friction disk 716 will generate a higher oil pressure at the groove center point 803 versus the prior art pad 918. When the clutch is disengaged, the higher oil pressure at the groove center point 803 will provide better separation and more lubrication between the driving friction disk 716 and interleaved driven plates versus the prior art pad 918.

Figure 10:
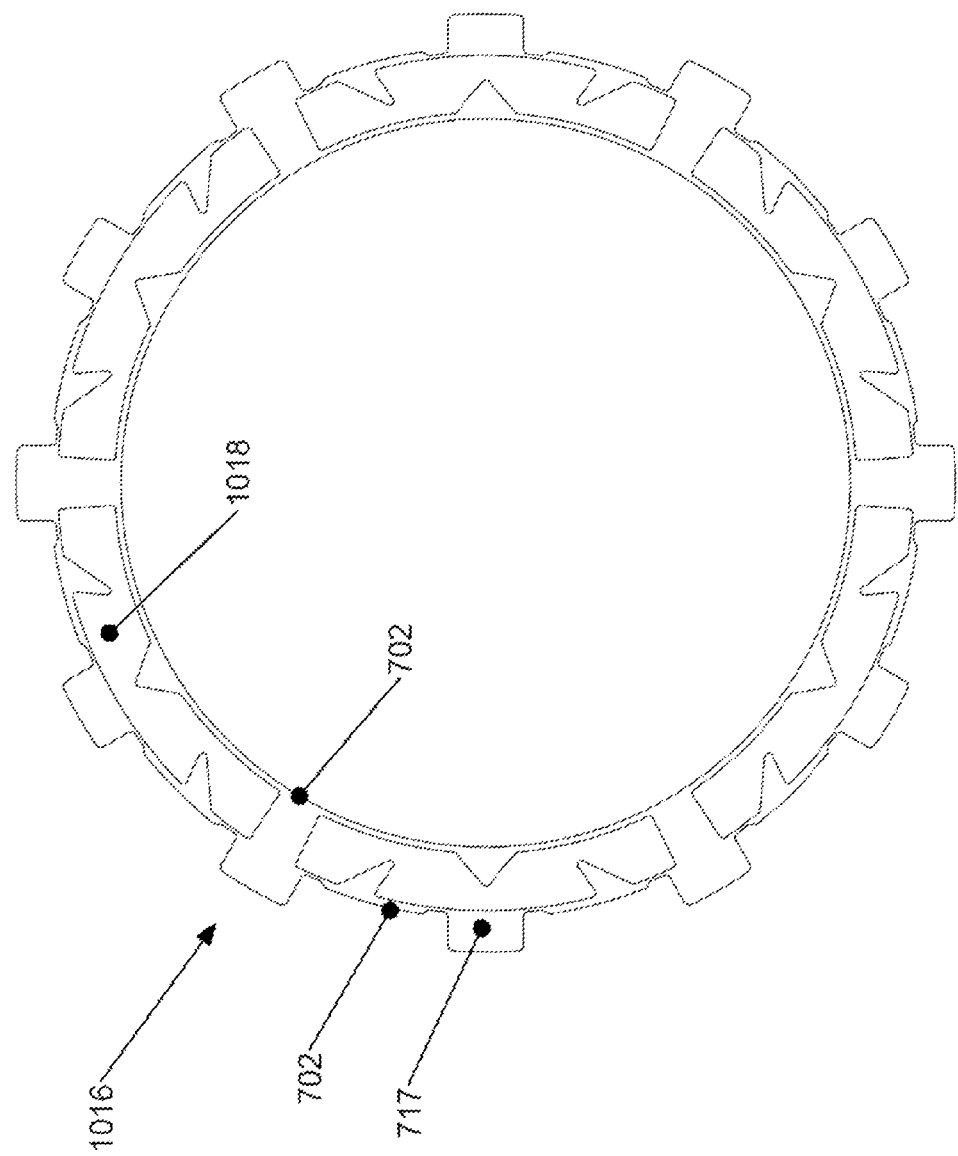
FIG. 10 is a diagram showing an alternative embodiment of the improved friction plate.
Figure 11:
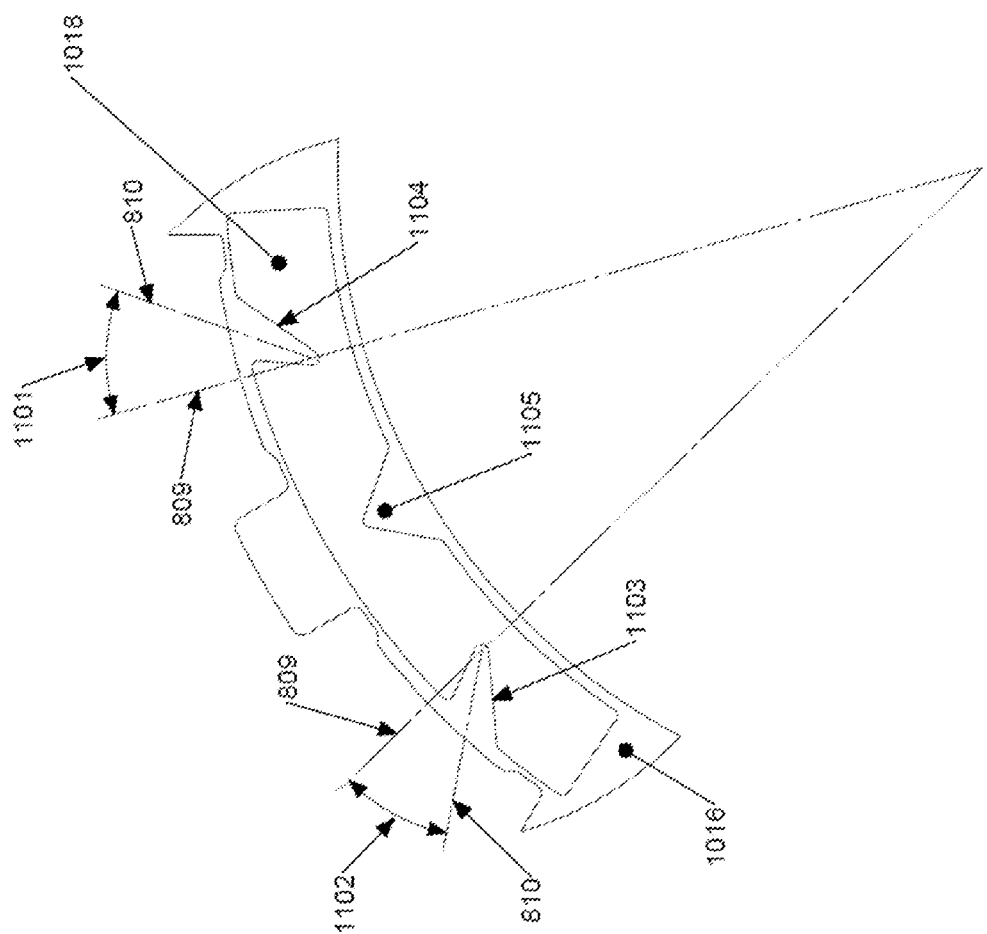
FIG. 11 is a view showing the details of an alternative embodiment of the improved friction pad.

FIGS. 10 and 11 show another preferred embodiment of a driving friction disk 1016 which includes a friction pad 1018 which is reduced in cost as compared with the friction pad 718 in that the friction pad 1018 uses less material and also increases the assembly efficiency of the driving friction disk 1016. To reduce cost and improve assembly efficiency, the friction pad 1018 should maximize the yield of the friction paper and a single friction pad 1018 should perform equally when placed on either side of the driving friction disk 1016. Typically, friction pads 1018 are cut from a larger sheet of friction paper. When compared to friction pad 718, friction pad 1018 utilizes less friction paper and may be organized in a tighter pattern to maximize the yield from a sheet of friction paper. The friction pad 718 of the preferred embodiment includes a friction pad tab portion 808 that reduces the yield from a sheet of friction paper. The friction pad 1018 eliminates the friction pad tab portion 808 beneficially increasing yield from a sheet of friction paper while sacrificing some oil capture capability.

To ensure that the groove offset angle beneficially captures oil as the driving friction disk 1016 rotates through the oil, the opposite side of the driving friction disk 1016 requires a mirror image of the friction pad 1018. The friction pad 1018 includes a positive groove offset angle 1101 and a negative groove offset angle 1102. The friction pad 1018 ensures that at least one outer diameter V shaped groove 1103 or 1104, will beneficially capture oil regardless of which side of the driving friction disk 1016 the friction pad 1018 is bonded to or which direction the driving friction disk 1016 is rotating.

In many wet clutch configurations, the primary method of oil delivery to the inner diameter of the clutch plate 702 is through oil flow from centrifugal force. This is in contrast to the outer diameter of the clutch plate 701 which receives oil flow primarily by passing through an oil bath. For the inner diameter of the clutch plate 702, a groove offset angle does not provide the same magnitude of benefit as the groove offset angle for the outer diameter of the clutch plate 701. In this embodiment, the inner diameter V shaped groove 1105 has a groove offset angle of 0 degrees to allow the groove to perform equally, regardless of the direction of rotation.

Figure 12:
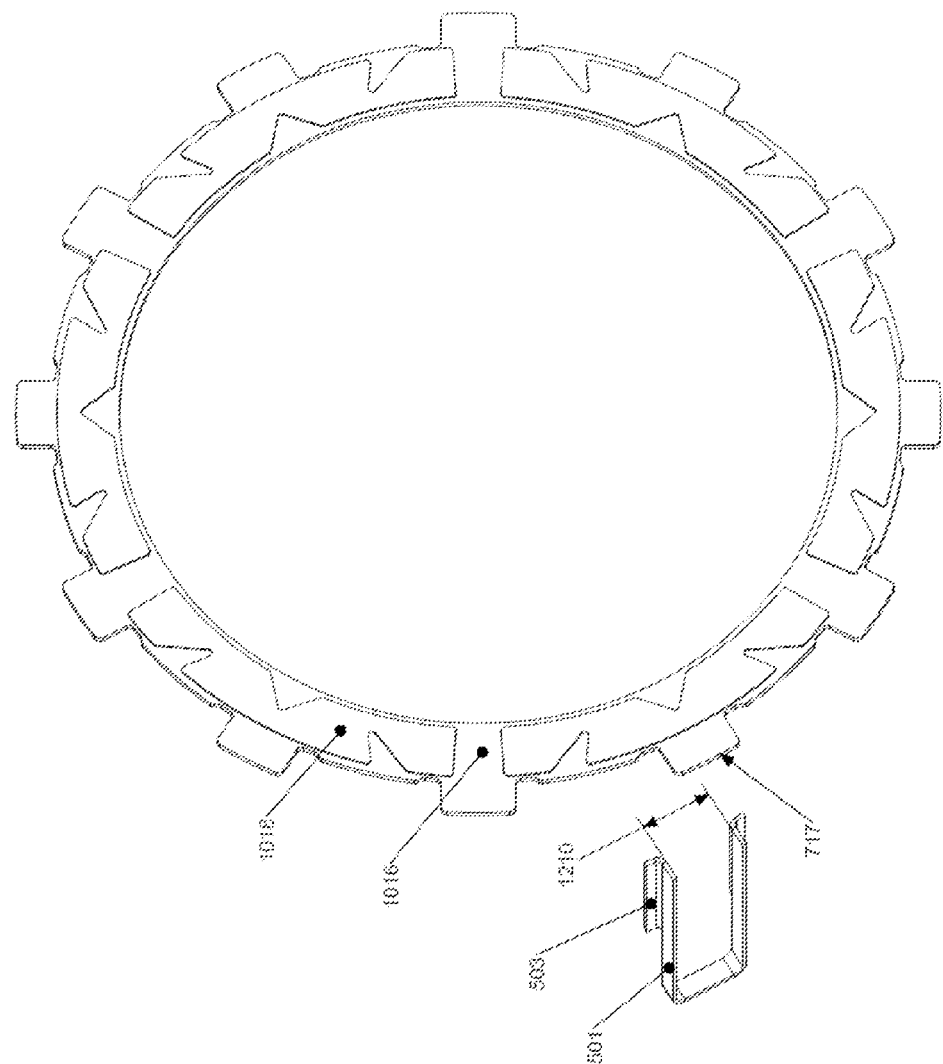
FIG. 12 is an isometric view of a preferred embodiment of an improved driving friction disk and wear liner.

FIG. 12 is an isometric view of an improved driving friction disk 1016 and the liner 501. The narrowed tabs 717 of the driving friction disk 1016 are sized appropriately to fit within the liner opening 1210 of the liner 501.

Figure 13:
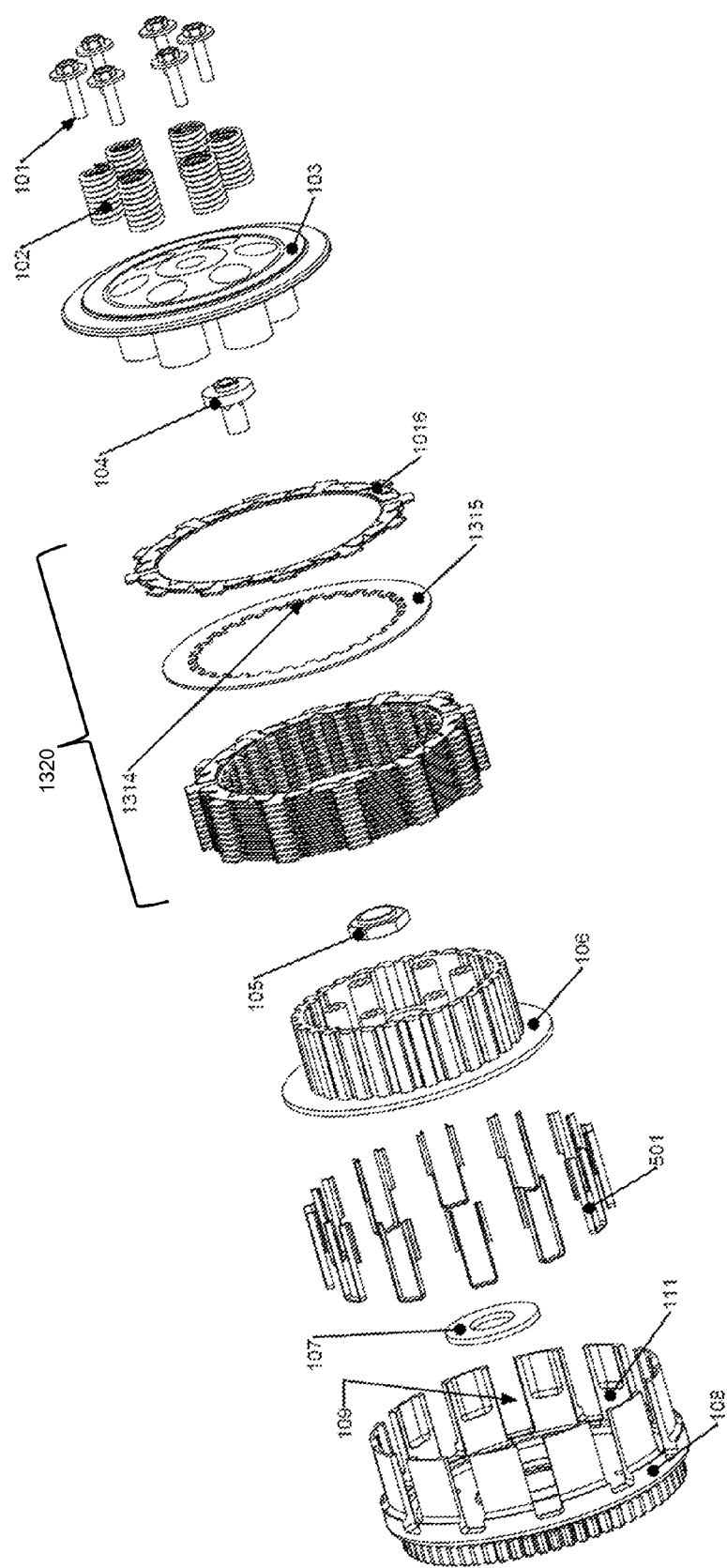
FIG. 13 is an exploded view of a preferred embodiment of an improved clutch pack configured within a prior art clutch system.

FIG. 13 is an exploded view of the prior art clutch shown in FIG. 1 and FIG. 2 utilizing an improved clutch pack 1320 and liners 501. The improved clutch pack 1320 is comprised of improved driving friction disks 1016 and reduced thickness driven disks 1315. The reduced thickness driven disks 1315 also have teeth 1314 which couple the reduced thickness driven disks 1315 to the profiled ring 110 of the center clutch 106. An alternative embodiment of the driven disk 1315 utilizes a reduced outer diameter as compared with the driven disk 115 to allow for increased clearance with the ID capture flanges 503 of the liner 501.

Figure 14:
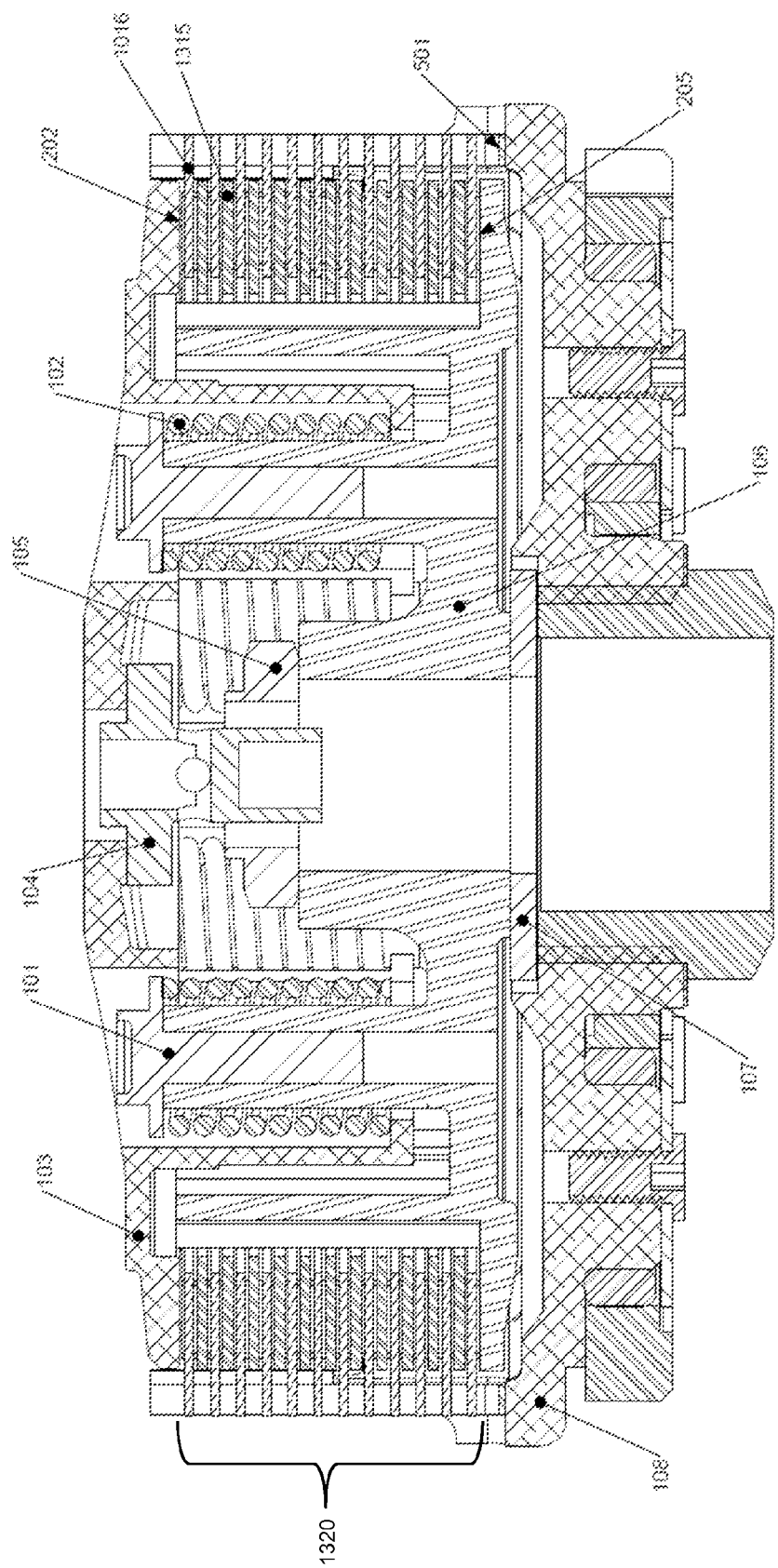
FIG. 14 is sectioned view of a preferred embodiment of an improved clutch pack configured within a prior art clutch system.

Also shown in FIG. 13 is that the basket 108 contains slots 109 which receive the liners 501 therefore rotationally coupling the clutch pack 1320 to the basket 108 via the wear liners 501. Standard springs 502 are also shown being used with the improved clutch pack 1320. The improved clutch pack 1320 allows the use of the standard springs 102 because the improved clutch pack 1320 retains approximately the same overall height or thickness as the clutch pack 120. The clutch pack 1320 is shown configured with twelve driving friction disks 1016 and eleven reduced thickness driven disks 1315 as compared with the standard clutch pack 120 which typically consists for eight driving friction disks 116 and seven driven disks 115. With the increased number of driving friction disks 1016 and interleaved reduced thickness driven disks 1315 the torque capacity of the clutch system is significantly increased when the standard springs 102 are used. In an alternative embodiment lower force springs are selected for use with the clutch system utilizing clutch pack 1320 such that the torque capacity of the clutch system with clutch pack 1320 matches that of the clutch system utilizing clutch pack 120 with standard springs 102. Reducing the spring force compelling the pressure plate 103 results in the operator being able to significantly reduce the effort require to operate the clutch disengagement system (not shown) because of the reduced force springs being used with the clutch pack 1320. In other embodiments the thickness of the driven disks 1315 is altered to allow the number of driving friction disks 1016 to be decreased or increased in order to provide tuning options for clutch system torque capacity. For example a clutch pack 1320 could alternatively be configured with eleven improved driving friction disks 1016 and ten driven disks 1315 where the drive disks 1315 have an increased thickness as compared to the drive disks 1315 utilized with a clutch pack 1320 that contains twelve improved driving friction disks. In yet another embodiment, eleven driving friction disks 1016 of a different thickness could be utilized while maintaining the thickness of the driven disks 1315 shown in the improved clutch pack 1320 with twelve driving friction disk 1016 as depicted in FIG. 14.

In addition, or separately, springs 102 can be selected with increased or decreased spring force in order to also adjust torque capacity and change the input force required to operate a clutch disengagement system (not shown) for moving the throw-out 104 in order to selectively position the pressure plate 103.

Furthermore, the friction pads 1018 are designed to minimize parasitic drag when pressure is removed from the improved clutch pack 1320. Parasitic drag exists whenever the surfaces in contact between improved driving friction disks 1016 and driven plates 1315 decouple but remain in close proximity to one another allowing surface tension in cooling fluid such as oil to cause parasitic drag and/or incidental contact to cause parasitic drag. The design of the friction pads 1018 and their respective arrangement on both sides of the improved driving friction disks 1016 allow the improved driving friction disks 1016 to rotate independently of the driven plates 1315 with an acceptable amount of parasitic drag. Optimizing the shape and features of the friction pads 1018 with respect to reducing parasitic clutch drag is important in allowing the improved driving friction disks 1016 to decouple from the driven plates 1315 when the pressure plate 103 is lifted away from the clutch pack 1320 via the throw-out 104. In other embodiments where more than eight improved driving friction disks 1016 are configured with interleaved driven plates 1315, the friction pad 1018 design maintains approximately the same amount of parasitic drag as the clutch pack 120. In these embodiments the advantage of configuring the clutch to accommodate more than eight improved driving friction disks 1016 further enhances performance aspects of the clutch. One option made possible if more than eight improved driving friction disks 1016 are used is for the operator to utilize lower force springs with the pressure plate 103 providing less force than the standard springs 102 in order to reduce effort in operating the clutch disengagement system (not shown), but while maintaining similar torque capacity to the clutch pack 120 utilizing eight friction disks 116.

In yet other embodiments additional components such as the basket 108, center clutch 106 and pressure plate 103 can be replaced with improved versions of these components which are engineered to be stronger and/or lighter and/or more durable. In these embodiments it can be advantageous to utilize these alternative components in order to allow springs 102 of increased force to be used which leads to increased torque capacity of the system exposing the prior art basket 108, and/or prior art center clutch 106 and/or prior art pressure plate to loads which may exceed their respective peak load limits. These "improved" components can be utilized with the improved clutch pack 1320 and liners 501 within the clutch system.

FIG. 14 a sectioned view of the prior art clutch shown in FIG. 1 and FIG. 2 utilizing the improved clutch pack 1320 comprised of an improved driving friction disks 1016 and reduced thickness driven disks 1315. As best seen in FIG. 14 the overall height of improved clutch pack 1320 is approximately the same as the prior art clutch pack 120. Improved clutch pack 1320 having approximately the same overall thickness or height allows the pressure plate 103 to remain in relatively the same position relative to the throw-out 104 which minimizes or eliminates disruption to the clutch disengagement system (not shown).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A clutch system including a clutch basket, said clutch basket having one or more slots, and a clutch pack including eight driving friction disks, said clutch pack having an overall thickness of approximately 35.2 millimeters, the improvement comprising: an improved clutch pack assembly having one or more liners, wherein said one or more liners configured to engage said one or more slots, each of said liners having two legs connected by a base, said base having a straight planar shape, said legs and said base forming a U-shape when said liner is located in one of said one or more slots and viewed in a first direction perpendicular to a basket center axis of rotation, each of said legs having a capture flange extending from an edge of said leg to form said leg as an L-shape when said liner is viewed in a second direction parallel to said basket center axis of rotation, whereby said capture flange engages a radially inwardly facing surface of said clutch basket to restrain said liner within said basket when said basket is rotated and whereby said liner does not engage a radially outwardly facing surface of said basket, said liners further configured such that, when said liners are in a free state and are not inserted into said slots, said legs extend from said base at an angle greater than 90 degrees; one or more improved driving friction disks; and one or more driven disks, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 35.2 millimeters.

2. The improved clutch pack of claim 1 wherein said improved clutch pack is configured with twelve said improved driving friction disks and at least eleven said driven disks wherein the approximate overall height of said clutch pack is 35.2 millimeters.

3. The improved clutch pack of claim 1 wherein said improved clutch pack is configured with eleven said improved driving friction disks and at least ten said driven disks wherein the approximate overall height of said clutch pack is 35.2 millimeters.

4. The improved clutch pack of claim 1 wherein said improved clutch pack is configured with ten said improved driving friction disks and at least nine said driven disks wherein the approximate overall height of said clutch pack is 35.2 millimeters.

5. The improved clutch pack of claim 1 wherein said improved clutch pack is configured with nine said improved driving friction disks and at least eight said driven disks wherein the approximate overall height of said clutch pack is 35.2 millimeters.

6. A clutch system including a clutch basket, said clutch basket having one or more slots, and a clutch pack including eight driving friction disks, said clutch pack having an overall thickness of approximately 36.4 millimeters, the improvement comprising: an improved clutch pack assembly having one or more liners, wherein said one or more liners configured to engage said one or more slots, each of said liners having two legs connected by a base, said base having a straight planar shape, said legs and said base forming a U-shape when said liner is located in one of said one or more slots and viewed in a first direction perpendicular to a basket center axis of rotation, each of said legs having a capture flange extending from an edge of said leg to form said leg as an L-shape when said liner is viewed in a second direction parallel to said basket center axis of rotation, whereby said capture flange engages a radially inwardly facing surface of said clutch basket to restrain said liner within said basket when said basket is rotated and whereby said liner does not engage a radially outwardly facing surface of said basket, said liners further configured such that, when said liners are in a free state and are not inserted into said slots, said legs extend from said base at an angle greater than 90 degrees;
one or more improved driving friction disks and one or more driven disks, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 36.4 millimeters.

7. The improved clutch pack of claim 6 wherein said improved clutch pack is configured with twelve said improved driving friction disks and at least eleven said driven disks wherein the approximate overall height of said clutch pack is 36.4 millimeters.

8. The improved clutch pack of claim 6 wherein said improved clutch pack is configured with eleven said improved driving friction disks and at least ten said driven disks wherein the approximate overall height of said clutch pack is 36.4 millimeters.

9. The improved clutch pack of claim 6 wherein said improved clutch pack is configured with ten said improved driving friction disks and at least nine said driven disks wherein the approximate overall height of said clutch pack is 36.4 millimeters.

10. The improved clutch pack of claim 6 wherein said improved clutch pack is configured with nine said improved driving friction disks and at least eight said driven disks wherein the approximate overall height of said clutch pack is 36.4 millimeters.

11. A clutch system including a clutch basket, said clutch basket having one or more slots, and a clutch pack including eight driving friction disks, said clutch pack having an overall thickness of approximately 33.8 millimeters, the improvement comprising: an improved clutch pack assembly having one or more liners, wherein said one or more liners configured to engage said one or more slots, each of said liners having two legs connected by a base, said base having a straight planar shape, said legs and said base forming a U-shape when said liner is located in one of said one or more slots and viewed in a first direction perpendicular to a basket center axis of rotation, each of said legs having a capture flange extending from an edge of said leg to form said leg as an L-shape when said liner is viewed in a second direction parallel to said basket center axis of rotation, whereby said capture flange engages a radially inwardly facing surface of said clutch basket to restrain said liner within said basket when said basket is rotated and whereby said liner does not engage a radially outwardly facing surface of said basket, said liners further configured such that, when said liners are in a free state and are not inserted into said slots, said legs extend from said base at an angle greater than 90 degrees; one or more improved driving friction disks; and one or more driven disks, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 33.8 millimeters.

12. The improved clutch pack of claim 11 wherein said improved clutch pack is configured with twelve said improved driving friction disks and at least eleven said driven disks wherein the approximate overall height of said clutch pack is 33.8 millimeters.

13. The improved clutch pack of claim 11 wherein said improved clutch pack is configured with eleven said improved driving friction disks and at least ten said driven disks wherein the approximate overall height of said clutch pack is 33.8 millimeters.

14. The improved clutch pack of claim 11 wherein said improved clutch pack is configured with ten said improved driving friction disks and at least nine said driven disks wherein the approximate overall height of said clutch pack is 33.8 millimeters.

15. The improved clutch pack of claim 11 wherein said improved clutch pack is configured with nine said improved driving friction disks and at least eight said driven disks wherein the approximate overall height of said clutch pack is 33.8 millimeters.

16. A clutch system including a clutch basket, said clutch basket having one or more slots, and a clutch pack including eight driving friction disks, said clutch pack having an overall thickness of approximately 35.2 millimeters, the improvement comprising: an improved clutch pack assembly having one or more liners; one or more improved driving friction disks, wherein said improved driving friction disk being provided with a core plate and a plurality of friction pads bonded to at least one side of said core plate, said friction pads each having at least one V shaped oil groove, said V shaped oil groove having a groove center point and a groove opening angle, said groove opening angle having a groove offset angle, said groove offset angle being measured between a line extending from the center of said improved driving friction disk through the center of said groove center point and a line extending from the center of said groove center point through the center of said groove opening angle and wherein said groove offset angle is greater than one half said groove opening angle; and one or more driven disks, wherein said one or more liners configured to engage said slots, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 35.2 millimeters.

17. The improved clutch pack of claim 16 wherein said improved clutch pack is configured with twelve said improved driving friction disks and at least eleven said driven disks wherein the approximate overall height of said clutch pack is 35.2 millimeters.

18. The improved clutch pack of claim 16 wherein said improved clutch pack is configured with eleven said improved driving friction disks and at least ten said driven disks wherein the approximate overall height of said clutch pack is 35.2 millimeters.

19. The improved clutch pack of claim 16 wherein said improved clutch pack is configured with ten said improved driving friction disks and at least nine said driven disks wherein the approximate overall height of said clutch pack is 35.2 millimeters.

20. The improved clutch pack of claim 16 wherein said improved clutch pack is configured with nine said improved driving friction disks and at least eight said driven disks wherein the approximate overall height of said clutch pack is 35.2 millimeters.

21. A clutch system including a clutch basket, said clutch basket having one or more slots, and a clutch pack including eight driving friction disks, said clutch pack having an overall thickness of approximately 36.4 millimeters, the improvement comprising: an improved clutch pack assembly having one or more liners; one or more improved driving friction disks, wherein said improved driving friction disk being provided with a core plate and a plurality of friction pads bonded to at least one side of said core plate, said friction pads each having at least one V shaped oil groove, said V shaped oil groove having a groove center point and a groove opening angle, said groove opening angle having a groove offset angle, said groove offset angle being measured between a line extending from the center of said improved driving friction disk through the center of said groove center point and a line extending from the center of said groove center point through the center of said groove opening angle and wherein said groove offset angle is greater than one half said groove opening angle; and one or more driven disks, wherein said one or more liners configured to engage said slots, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 36.4 millimeters.

22. The improved clutch pack of claim 21 wherein said improved clutch pack is configured with twelve said improved driving friction disks and at least eleven said driven disks wherein the approximate overall height of said clutch pack is 36.4 millimeters.

23. The improved clutch pack of claim 21 wherein said improved clutch pack is configured with eleven said improved driving friction disks and at least ten said driven disks wherein the approximate overall height of said clutch pack is 36.4 millimeters.

24. The improved clutch pack of claim 21 wherein said improved clutch pack is configured with ten said improved driving friction disks and at least nine said driven disks wherein the approximate overall height of said clutch pack is 36.4 millimeters.

25. The improved clutch pack of claim 21 wherein said improved clutch pack is configured with nine said improved driving friction disks and at least eight said driven disks wherein the approximate overall height of said clutch pack is 36.4 millimeters.

26. A clutch system including a clutch basket, said clutch basket having one or more slots, and a clutch pack including eight driving friction disks, said clutch pack having an overall thickness of approximately 33.8 millimeters, the improvement comprising: an improved clutch pack assembly having one or more liners, one or more improved driving friction disks, wherein said improved driving friction disk being provided with a core plate and a plurality of friction pads bonded to at least one side of said core plate, said friction pads each having at least one V shaped oil groove, said V shaped oil groove having a groove center point and a groove opening angle, said groove opening angle having a groove offset angle, said groove offset angle being measured between a line extending from the center of said improved driving friction disk through the center of said groove center point and a line extending from the center of said groove center point through the center of said groove opening angle and wherein said groove offset angle is greater than one half said groove opening angle; and one or more driven disks, wherein said one or more liners configured to engage said slots, said improved driving friction disk having an inner diameter and outer diameter of standard dimensions for use with said clutch basket and incorporating one or more narrowed tabs, said narrowed tabs having a width of predetermined size whereby said narrowed tabs are configured to fit within the space provided by said liner inserted in said slot, said liner covering the surfaces of said slots in driving contact with said narrowed tabs of said improved driving friction disks, said improved clutch pack configured to include more than eight improved driving friction disks, and more than seven driven disks, said improved clutch pack having an overall thickness of approximately 33.8 millimeters.

27. The improved clutch pack of claim 26 wherein said improved clutch pack is configured with twelve said improved driving friction disks and at least eleven said driven disks wherein the approximate overall height of said clutch pack is 33.8 millimeters.

28. The improved clutch pack of claim 26 wherein said improved clutch pack is configured with eleven said improved driving friction disks and at least ten said driven disks wherein the approximate overall height of said clutch pack is 33.8 millimeters.

29. The improved clutch pack of claim 26 wherein said improved clutch pack is configured with ten said improved driving friction disks and at least nine said driven disks wherein the approximate overall height of said clutch pack is 33.8 millimeters.

30. The improved clutch pack of claim 26 wherein said improved clutch pack is configured with nine said improved driving friction disks and at least eight said driven disks wherein the approximate overall height of said clutch pack is 33.8 millimeters.

* * * * *